(12) United States Patent
Sunamori et al.

(10) Patent No.: US 8,026,308 B2
(45) Date of Patent: Sep. 27, 2011

(54) PROCESS FOR PRODUCING SOLID DISPERSION OF FINELY PARTICULATE FUNCTIONAL COMPOUND

(75) Inventors: Takashi Sunamori, Funabashi (JP); Kiyoshi Shingae, Matsudo (JP); Kazuo Yanauchi, Funabashi (JP)

(73) Assignee: Taisei Chemical Industries, Ltd., Tokyo (JP)

( * ) Notice: Subject to any disclaimer, the term of this patent is extended or adjusted under 35 U.S.C. 154(b) by 294 days.

(21) Appl. No.: 11/578,805

(22) PCT Filed: Mar. 8, 2005

(86) PCT No.: PCT/JP2005/003986
§ 371 (c)(1),
(2), (4) Date: Oct. 18, 2006

(87) PCT Pub. No.: WO2005/103120
PCT Pub. Date: Nov. 3, 2005

(65) Prior Publication Data
US 2007/0238811 A1    Oct. 11, 2007

(30) Foreign Application Priority Data

Apr. 19, 2004  (JP) .................................. 2004-122700

(51) Int. Cl.
*C08L 101/00*  (2006.01)
*C08J 3/20*  (2006.01)

(52) U.S. Cl. ........ 524/800; 523/207; 523/210; 523/200; 523/205; 523/340; 523/351; 524/845; 8/924; 8/925; 8/531

(58) Field of Classification Search .................. 523/351, 523/207, 210, 200, 205, 340; 8/924, 925, 8/531; 524/800, 845
See application file for complete search history.

(56) References Cited

U.S. PATENT DOCUMENTS

| | | | | |
|---|---|---|---|---|
| 2,904,402 A | * | 9/1959 | Cauterman | .................... 423/632 |
| 4,789,566 A | * | 12/1988 | Tatsuno et al. | ............. 427/388.2 |
| 5,328,504 A | * | 7/1994 | Ohnishi | ........................ 524/388 |
| 6,136,907 A | | 10/2000 | Sunamori et al. | |
| 6,503,962 B1 | * | 1/2003 | Mouri et al. | ................... 523/102 |

(Continued)

FOREIGN PATENT DOCUMENTS

DE    19639632    4/1998

(Continued)

OTHER PUBLICATIONS

Abstract of document N above.*

(Continued)

*Primary Examiner* — Vasu Jagannathan
*Assistant Examiner* — Mark S Kaucher
(74) *Attorney, Agent, or Firm* — Paul E. White, Jr.; Manelli Selter PLLC

(57) ABSTRACT

A process for producing a solid dispersion comprising a resin and a functional compound dispersed therein, which comprises: kneading a powdery functional compound together with deionized water while gradually introducing the deionized water; adding a resin and, according to need, an additive to the mixture; subsequently heating and kneading the resultant mixture in a vessel which has an atmosphere causing the resin to soften at a temperature not higher than the boiling point of the deionized water and which has been tightly closed according to need so as to function like a pressure cooker to thereby disperse the functional compound into the softened resin; and kneading the resultant dispersion with heating at ordinary pressure or a reduced pressure to remove the water by vaporization.

12 Claims, 5 Drawing Sheets

U.S. PATENT DOCUMENTS 6,506,807 B1 * 1/2003 Yanagihara et al. ............ 521/56
2001/0009933 A1 * 7/2001 Miyabayashi ................ 523/160

FOREIGN PATENT DOCUMENTS

| EP | 1000960 | | 5/2000 |
| EP | 1602693 | | 12/2005 |
| JP | 04080240 A | * | 3/1992 |
| JP | 06184349 A | * | 7/1994 |
| JP | 3069537 | | 3/1999 |
| JP | 2002363294 | | 12/2002 |
| WO | WO 2005/087853 | | 9/2005 |

OTHER PUBLICATIONS

Abstract of document O above.*

Buck et. al. Analytical Chemistry 1954, 26, 7, 1240-1243.*

* cited by examiner

FIG. 4
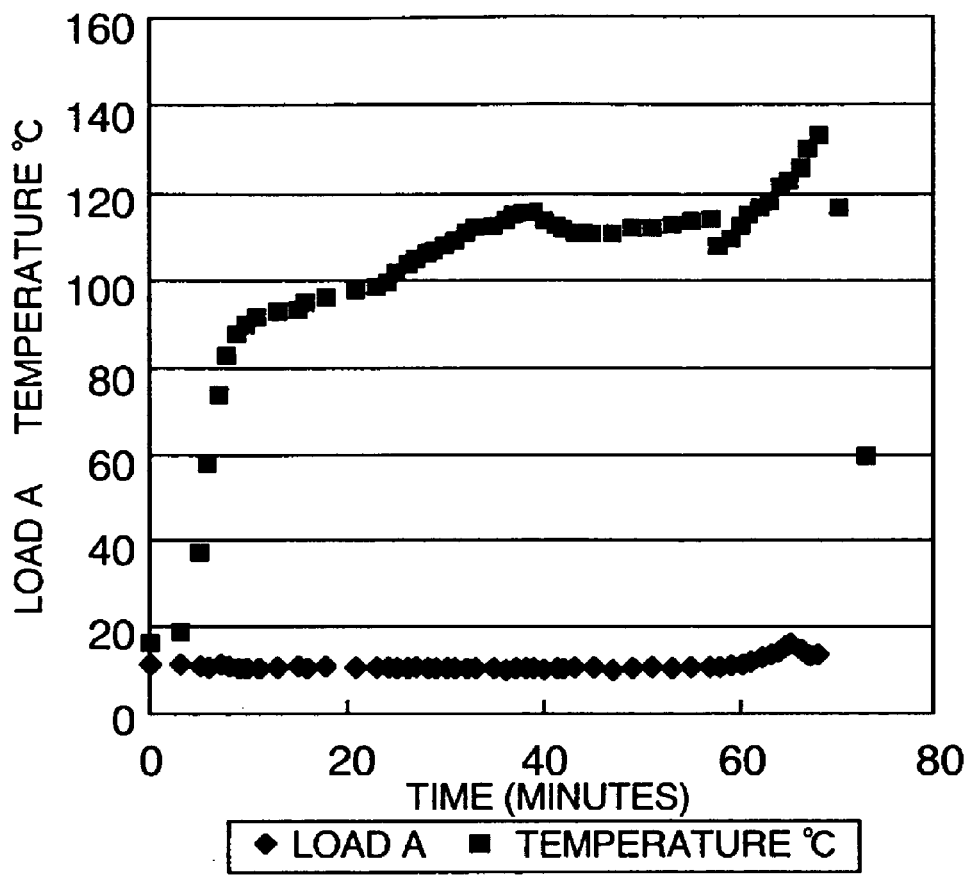
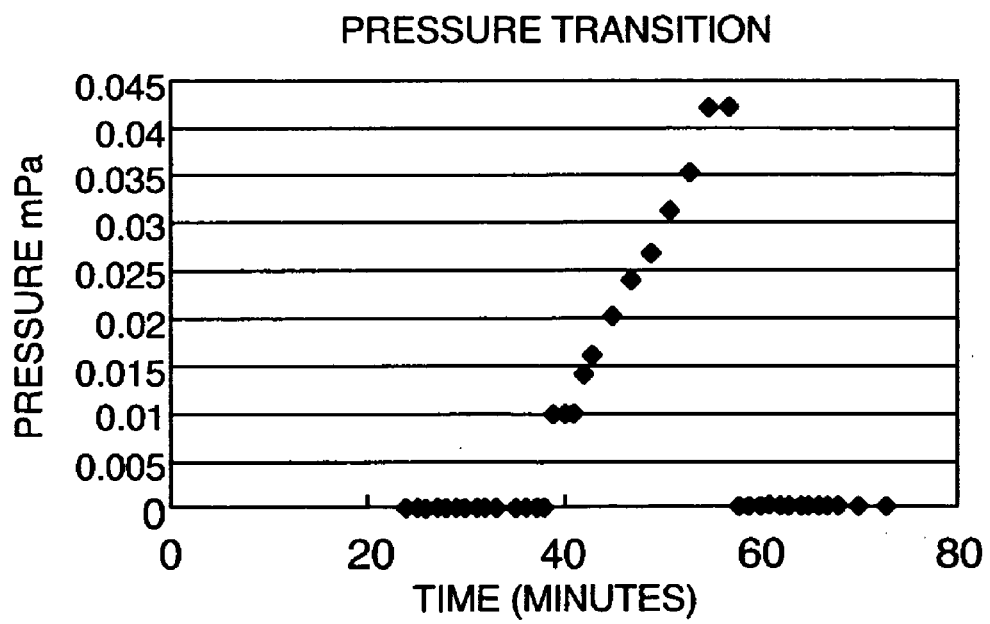

PROCESS FOR PRODUCING SOLID DISPERSION OF FINELY PARTICULATE FUNCTIONAL COMPOUND

This application is the national phase of international application PCT/JP2005/003986 filed 8 Mar. 2005 which designated the U.S.

TECHNICAL FIELD

The present invention relates to a process for producing a solid dispersion of a functional compound, for example, a coloring substance such as a pigment, dye or the like, an ultraviolet light absorbing substance, a fluorescent substance, or a magnetic substance, wherein the functional compound is dispersed in a resin in a finely particulate form. More specifically, the present invention relates to a process for producing at low cost a solid dispersion wherein fine particles of a functional compound are dispersed in a resin in their inherent particle size, by environmentally-friendly and simple steps which are capable of saving energy and in which no organic compound is discharged. The solid dispersion of such particulate functional compound can be widely used, for example, for a general coating or ink as well as in fields relating to IT devices, for instance, for an ink for an inkjet system, for a coating or ink for the color filter used in flat displays, as a colorant for a toner used in color copier machines, for a coating material for a polarizing filter, as an intermediate functional compound paste for electronic devices and the like.

BACKGROUND ART

In a solid dispersion of a particulate functional compound as mentioned above, it is desirable that the functional compound is dispersed in a resin without making any aggregate and in its inherent finely particle size, in order to effectively exhibit its intended function.

In the past, a process for producing a solid dispersion of such a particulate functional compound was conducted by using a kneader which was equipped with a kneading shaft capable of heating and cooling, a vessel jacket, and a plunger for confining the kneaded product into the vessel under by slight pressure, and the process comprised the steps of:

(1) introducing into the kneader a finely particulate functional compound, a solid resin, an organic solvent for dissolving the resin, and additives as necessary, and then kneading the introduced mixture while volatilizing the organic solvent thereof by heat from the kneading shaft and the vessel jacket to produce a pitch-like highly viscous mass;

(2) roughly crushing the obtained highly viscous mass, subdividing the crushed matter into small quantities of between 10 and 30 kg, then passing the subdivided matter between two rolls to form a sheet, and folding the formed sheets to pass it again through the two rolls, and repeatedly carrying out the roll-kneading steps in between 30 and 100 times; and (3) crushing the obtained roll kneaded product with a palletizing machine or a crusher to thereby obtain a final product.

Particularly, the above-described step (2) carried out by roll-kneading was important to finely disperse a functional compound into a resin, and thus was essential in the conventional process.

On the other hand, the above-described step (2) required a large amount of labor and energy, so that this step (2) has become a barrier to improved productivity. Accordingly, while the conventional method resulted in a high quality solid functional substance dispersion wherein the functional substance are dispersed in its inherent particle size, its production costs were high and its applications were limited to special fields.

In addition, in the conventional process, an organic solvent is introduced together with a functional compound and a solid resin, in order to soften the resin and to increase the affinity between the functional compound and the solid resin by wetting the functional compound therewith. However, in the process, the organic solvent, i.e. a hydrocarbon, is released into air, then the process was undesirable also in terms of atmospheric contamination. Further, since the organic solvent and the resin have a high affinity with each other, in some cases the organic solvent completely was not removed during the kneading step with heat and may remain in the kneaded product. When the obtained product is dissolved to use, the solubility of the product deteriorates being accompanied by volatilizing the organic solvent over time, which sometimes caused quality deterioration such as transparency, gloss and the like.

With respect to the various problems associated with this conventional method, the present inventors had found that impurity electrolyte prevents a functional compound from finely dispersing into a resin. Then, based on the discovery, the present inventors proposed a processes of finely dispersing a functional compound into a resin either by using a purified paste formed by purifying a water-containing paste of the functional compound with an ion-exchange method; or by preparing a water-containing paste from a dried pigment, then similarly preparing, from the water-containing paste, a purified paste with an ion-exchange method, subjecting the purified paste to a flashing process, namely a dispersing method in which a purified paste and a resin are kneaded and dewatered. (U.S. Pat. No. 6,136,907, and Japanese Patent No. 3069537)

These methods enabled a functional substance to be finely dispersed without any mechanical steps, and were revolutionary in terms of energy saving and environmental friendliness.

On the other hand, in this process, the purifying steps by ion-exchange caused relatively high equipment costs. Further, because the paste after purifying contained a relatively large amount of water content, the steps following the purification required fairly high costs and a fair amount of labor. Further, in the case of using a functional compound which contains a relatively large amount of impurity electrolyte, it was not easy to conduct the purification efficiently. Accordingly, there still are needs for Methods improved in terms of production costs and efficient production.

Moreover, if a resin having a high softening point was used, there was no alternative but to employ an organic solvent, so that the problem of the conventional methods of using an organic solvent has not been completely resolved.

DISCLOSURE OF THE INVENTION

It is an object of the present invention to provide a method which resolves the problems of the above-described conventional techniques. Namely, it is an object of the present invention to provide a method which is applicable to resins having various softening points without using an organic solvent. It is another object of the present invention to provide a method which can produce simply and at low cost a functional compound dispersion that has excellent quality in terms of transparency and gloss after coating. It is still another object of the present invention to provide a method which satisfies the demands for energy saving and pollution-free.

As a result of extensive investigation into the above-described problems, the present inventors have discovered that when an organic solvent or a mixed solution consisting of an organic solvent and water was used for softening a resin, since the amount of added organic solvent was small, the organic solvent not only does not function as a medium which increases the dispersibility of the functional compound, but also envelop the functional compound aggregates as-is which an impurity electrolyte nucleates, whereby a roll-kneading step was essential to break up these aggregates to improve the dispersibility of the functional compound. In view of this discovery, the present inventors have focused on "water", although water did not attract any attention as a medium for kneading a functional compound because it has been conventionally thought that water can not dissolve a resin and its wettability to a functional compound would be lower than that of an organic solvent. Then, kneading a functional compound with only deionized water, the present inventors made the surprising discovery that, compared with an organic solvent, a large amount of deionized water permeated between the individual particles of the functional compound and was retained therein, the impurity electrolyte-nucleating aggregates were broken apart by the affinity of the deionized water with the impurity electrolyte.

Further, the present inventors also discovered that, even when impurity electrolyte which serve as the aggregate nuclei are entrapped in the functional compound, if kneading is carried out using only deionized water, the impurity electrolyte are eluted into the deionized water, whereby the water molecules act as a carrier for carrying the impurities out of the system when the deionized water is evaporated, and that these impurity electrolyte almost never return back into a resin which had contained it as a result of their low affinity with the resin. This cleaning effect is especially effective when using a functional compound which contains a large amount of impurity electrolyte.

Based on the discovers as that described above, the present invention provides a "method which can manufacture a high quality particulate functional compound solid dispersion by simple steps that does not employ mechanical energy, which does not use an organic solvent, and which can be conducted by just a minor modification to conventional equipments".

That is, the present invention provides a process for producing a solid dispersion in which a functional compound is dispersed in finely particulate form, which comprises: (1) kneading the functional compound with deionized water while gradually adding the deionized water; adding to the obtained kneaded product a resin and an additive optionally; kneading the resultant mixture while heating it under the conditions in which the resin softens at a temperature equal to or less than the boiling point of the deionized water to whereby cause the functional compound to disperse into the softened resin; and kneading the obtained kneaded dispersion while heating it at atmospheric pressure or reduced pressure to distill off moisture contained in the kneaded dispersion.

In step (1) of the present invention, the initially introduced amount of deionized water is preferably less than 30 parts by weight per 100 parts by weight of the functional compound, and, after the initial introduction, the deionized water is preferably added stepwise or continuously at the rate of less than 10 parts by weight per minute per 100 parts by weight of the functional compound. In addition, the rate of adding deionized water after the initial introduction is preferably increased in a stepwise or continuous manner. Further, the resin is preferably added to the obtained dough-like kneaded product when a total amount of deionized water is within ±20% of maximum deionized water retention amount, i.e., a maximum amount in which the deionized water is retained in the kneaded product without any exudation.

In step (2) of the present invention, preferably, a mixture in which the resin and an additive as necessary were added to the kneaded product consisting of deionized water and a functional compound is heated in a sealed vessel to make the atmosphere inside the vessel a pressurized atmosphere of water vapor from the deionized water, whereby the mixture is kneaded while heating it in the pressurized atmosphere of the water vapor. Alternatively, the mixture is preferably firstly kneaded under atmospheric pressure while heating, then the vessel is sealed and heating is continued to make the atmosphere inside the vessel a pressurized atmosphere of water vapor from the deionized water, and the mixture is kneaded while heating it in the pressurized atmosphere. In this embodiment, the heating in a pressurized atmosphere of water vapor from the deionized water is preferably started when the ambient temperature is not 100° C. or greater.

In step (3) of the present invention, the obtained kneaded dispersion is preferably further kneaded while heating it under atmospheric pressure to distill off moisture contained in the kneaded dispersion.

The solid dispersion obtained by the process of the present invention provides a dispersion wherein a particulate functional compound is dispersed in a resin in its inherent particle size and without containing any organic solvent.

The process according to the present invention does not use an organic solvent. Thus, according to the present invention, an environmentally friendly production process is provided which does not involve the release of organic substances. Further, the product obtained according to the present invention does not suffer from quality deterioration as coated due to residual organic solvent. Therefore, the process according to the present invention can provide a product whose quality is superior to that of the products produced by the methods which use an organic solvent. Further, the present invention enables a functional compound to be dispersed in a resin in its inherent particle size by a simple step of kneading the functional compound with only deionized water. Thus, the roll-kneading and ion-exchange steps of the conventional methods have become unnecessary, whereby a dramatic decrease in cost and energy saving can be achieved.

BRIEF DESCRIPTION OF THE DRAWINGS

FIG. 4 is a graph illustrating the transition in pressure inside the vessel, the load current for heating and temperature inside the vessel by heating during the second step of Example 3.

DESCRIPTION OF SYMBOLS

Figure 1:
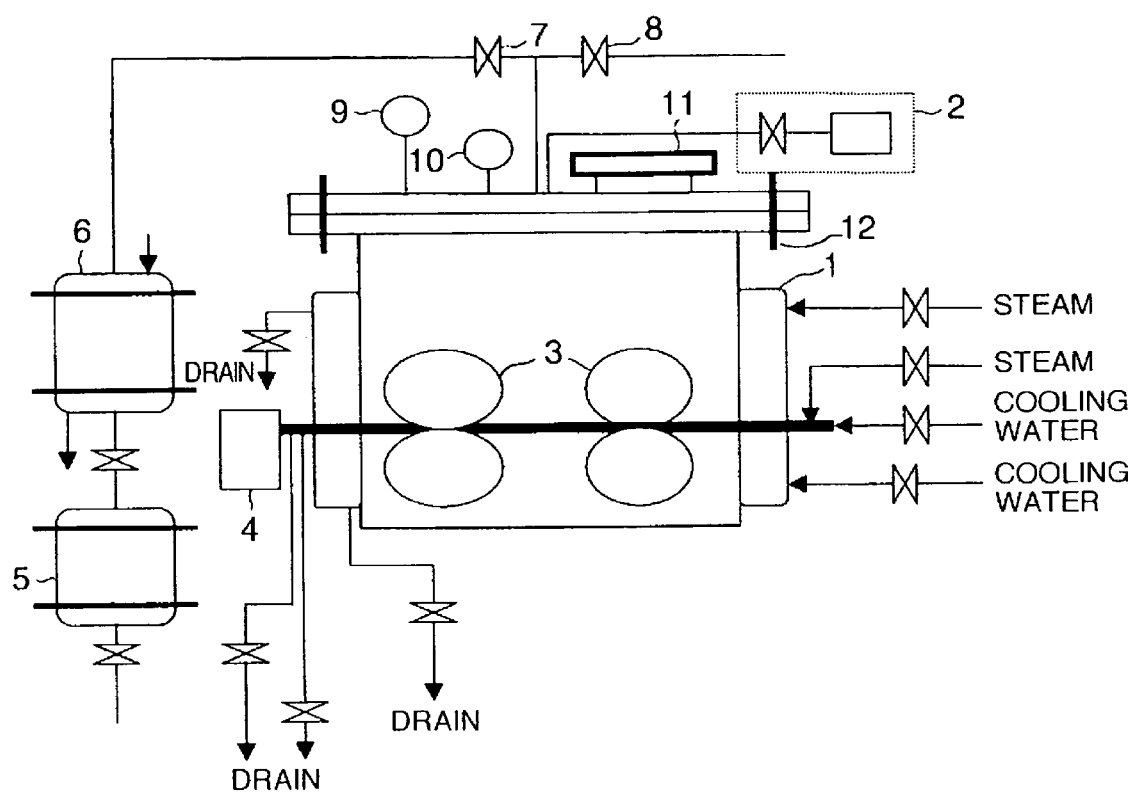
FIG. 1 is a schematic structural diagram illustrating one example of a kneader used in the production process according to the present invention.

1 Jacket
2 Deionized water introduction means
3 Kneading means (twin-screw kneading blades)
4 Driving machine 5 Receiving machine
6 Uptake removal means (condenser)
7 Vessel opening/closing means (gate valve)
8 Safety valve
9 Pressure gauge
10 Thermometer
11 Spyglass
12 Bolt
13 Center roll
14 Feed roll
15 Apron roll
16 Kneading material

BEST MODE FOR CARRYING OUT THE INVENTION

The process according to the present invention will be explained below in more detail describing each step thereof.
(1) Kneading of the Functional Compound and Deionized Water In the process according to the present invention, first, a powdery functional compound is kneaded with deionized water.

During kneading the functional compound, by introducing only deionized water which does not contain any organic solvent, a large amount of water penetrate between the respective particles of the functional compound, whereby the functional compound aggregates which impurity electrolyte nucleates can be broken up. Further, the impurity electrolyte nucleating the functional compound aggregates can be eluted into the deionized water, and be carried by water molecules out of the system during the subsequent heating.

The functional compound used in the present invention may be any organic or inorganic compound, and, for instance, may include pigments or coloring matter; special function coloring matter such as fluorescent coloring matter, electrochromic coloring matter, photochromic coloring matter, dichromatic coloring matter for polarizing films, thermochromic coloring matter, piezochromic coloring matters or the like; and compounds which possess various functions, such as near infrared ray absorbing compounds, ultraviolet ray absorbing compounds, magnetic compounds, flame-retardant compounds and the like.

Specifically, pigments and coloring matter may include, for instance, inorganic pigments or coloring matter comprising any one selected from the group consisting of titanium dioxide, zinc oxide, basic lead sulfate, calcium plumbate, zinc phosphate, aluminum phosphate, zinc molybdate, calcium molybdate, yellow lead, synthetic yellow iron oxide, transparent red oxide, titanium yellow, zinc yellow, strontium chromate, red oxide, red lead, chrome vermillion, basic lead chromate, chromium oxide, Prussian blue, ultramarine blue, cobalt blue, calcium carbonate, barium sulfate, talc, clay, silica, mica, graphite, iron black and carbon black, or a complex inorganic pigment or coloring matter comprising two or more thereof; or organic pigments or coloring matter comprising any one selected from the group consisting of monoazo red, quinacridone Red, monoazo red Mn salt, monoazo Bordeaux Mn salt, monoazo maroon Mn salt, anthanthrone red, anthraquinonyl red, perylene maroon, quinacridone Magenta, perylene Red, diketopyrrolopyrrole, benzimidazolone orange, quinacridone Gold, monoazo yellow, cis-azo Yellow, isoindolinone yellow, metal complex salt azo yellow, quinophthalone yellow, benzimidazolone yellow, copper phthalocyanine green, brominated phthalocyanine green, copper phthalocyanine blue, indanthren Blue, dioxane violet, fast yellow group, permanent yellow HR, acetanilide type monoazo yellow, Lake Red 4R, Permanent Carmine FB, Brilliant Fast Scarlet, Pyrrazolone Red B, Watchung Red metal salts, Lithol Red Ba salt, Brilliant Carmine 6B, Bordeaux 10B, Rhodamine 6G Lake, condensation type azo red, Naphthol AS Red, or a complex organic pigment or coloring matter comprising two or more thereof.

In the present invention, obviously, pigments or coloring matter which is hardly dissolved in water can also be employed, which are used in inks, cosmetics or the like. Further, a complex pigments or coloring matter which combines an inorganic pigment or coloring matter with an organic pigment or coloring matter can also be employed.

The fluorescent pigments or coloring matter may include, for instance, water-resistant fluorescent pigments or coloring matter which individually contain any one selected from the group consisting of inorganic compounds, such as zinc sulfide compounds which can either contain or not contain copper atom, calcium sulfide compounds which can either contain or not contain bismuth atom, and the like; and organic compounds known as "Lumogen Color"; or water-resistant fluorescent pigment or coloring matter complexes which contain two or more thereof.

The electrochromic coloring matter may, for instance, include tungsten oxide, viologen coloring matter and the like. Photochromic coloring matter may include, for instance, fulgide derivative coloring matter, indolylfulgide derivative coloring matter and the like. The piezochromic coloring matter include acridine derivative coloring matter and the like. The dichromatic coloring matter for polarizing films may include, for instance, benzidine derivative coloring matter, stilbene derivative coloring matter, dianisidine derivative coloring matter and the like.

The near infrared ray absorbing functional compounds may include, for instance, polymethine dye derivatives and the like. The ultraviolet ray absorbing compounds may include, for instance, benzotriazole derivatives and the like.

The magnetic compounds may include, for instance, silicon carbides, ferrites such as barium ferrite, gamma iron oxides, boron nitrides and the like. The flame-retardant compounds may include, for instance, hydroxides of magnesium or aluminum, basic magnesium sulfate, wollastonite, calcium silicate and the like.

In the present invention, these functional compounds are used in particle form. However, their particle size is not especially limited, and may be selected depending on the intended use of the solid dispersion.

The introduced amount of these functional compounds can be set appropriately depending on the intended use of the solid dispersion, while giving consideration to the introduced amount of resin used as the dispersion medium. Moreover, while it is necessary to give consideration to the total volume of the kneader, normally a rough target for the sum of the functional compound and the resin g is a weight of ⅔ of the total volume of the kneader in milliliters converted into grams. The amount to be introduced can be found by multiplying this sum of the functional compound and the resin by the desired blend ratio of the functional compound (functional compound (g)/sum of the functional compound and resin (g)). In any case, there is normally no problem as long as the weight converted into grams is not greater than ⅘ of the total volume of the kneader in milliliters.

The electric conductivity of the deionized water used in the present invention is preferably not greater than 5 μS/cm, more preferably not greater than 3 μS/cm, and even more preferably not greater than 1 μS/cm.

If the electric conductivity exceeds 5 μS/cm, in some cases impurity electrolyte are mixed in the deionized water, whereby the effects of breaking up the aggregates or removing the impurity electrolyte which act as a nucleus for such aggregates may not be sufficiently exerted.

The kneading of the powdery functional compound with the deionized water is performed while "gradually" adding the deionized water.

If the required amount of water is added into the functional compound all at once, the resultant mixture becomes so-called a "globular state", whereby a kneaded product cannot be obtained in which the deionized water is uniformly dispersed between the respective particles of the functional compound. In contrast, if the mixture is kneaded in while adding the deionized water gradually, a large amount of deionized water can be made to permeate between the fine particles of the functional compound, whereby a kneaded product can be obtained wherein the functional compound is uniformly dispersed in a fine particulate form.

In the present invention, the initial introduction of deionized water also has the meaning of aiding easy permeation of additive deionized water by roughly dispersing, in advance, a part of deionized water into a functional compound. Therefore, if the initially introduced amount is excessive, the deionized water does not well permeate between respective particles of the functional compound, and thus the functional compound may be dispersed in slurry in the so-called "globular state".

The rate of adding deionized water is also an important factor in retaining a greater amount of deionized water in the functional compound. Therefore, also in cases where the rate of adding deionized water after the initial introduction was too fast, portions may appear where the deionized water has not permeated between the particles of the functional compound, whereby the effects of breaking up the aggregates by deionized water or removing the impurity electrolyte by the deionized water may not be sufficiently exerted.

The initially introduced amount of deionized water and the rate of adding deionized water after the initial introduction need to be determined depending on the affinity between the deionized water and the used functional compound.

Typically, from the above-described perspective, the initially introduced amount of deionized water is preferably less than 30 parts by weight per 100 parts by weight of functional compound, more preferably less than 25 parts by weight per 100 parts by weight of functional compound, and especially preferably less than 20 parts by weight per 100 parts by weight of functional compound.

From the same perspective, after the initial introduction, deionized water may be added stepwise or continuously preferable at the rate of less than 10 parts by weight per minute per 100 parts by weight of functional compound, and especially preferable at the rate of less than 7.5 parts by weight per minute per 100 parts by weight of functional compound.

In addition, to make a greater amount of deionized water smoothly permeate into the functional compound, after the initial introduction the deionized water is added preferably in such a way that the added amount per unit time increases stepwise or continuously. For example, for the 10 minutes after the initial introduction, the kneading can be carried out preferably while adding deionized water in an amount of 1.5 to 2.5 parts by weight per 100 parts by weight of introduced functional compound per minute, and subsequently in an amount of from 4.5 to 7.5 parts by weight per 100 parts by weight of introduced functional compound per minute. Of course these steps can be split into more multiple sub-steps to thereby increase the introduced amount of the deionized water. Further, the introduced amount of the deionized water may be increased continuously as time progresses.

For a functional compound whose rate of being permeated and wetted by the deionized water is slow, the amount of adding deionized water after the initial introduction may be set at a roughly even level per unit time (minutes). For example, the kneading may be preferably carried out while maintaining the conditions for adding deionized water in a range of between 1.5 and 2.5 parts by weight per 100 parts by weight of introduced functional compound per minute until the end.

The total amount of deionized water in the present invention is preferably within ±20% of maximum deionized water retention amount, defined as the maximum amount in which deionized water is retained in the kneaded product without any exudation. More preferably, it is an amount of from −10% to +20% of the maximum deionized water retention amount, and especially preferably is the maximum deionized water retention amount. Therefore, it is preferable to stop adding the deionized water at the time when the total introduced amount of deionized water reaches this amount.

A dough-like kneaded product retaining deionized water in such an amount can provide the desired aggregate break-up capability and the electrolyte impurity elution effects of the deionized water, and further enables the efficient dispersal of the functional compound into a resin and the removal of the deionized water during the subsequent heating and kneading steps. In the present invention, by the very simple step of kneading a functional compound while gradually adding deionized water, a dough-like kneaded product containing a suitable amount of deionized water can be obtained which can exert the above advantageous effects. This feature deserves particular attention.

When judging whether the maximum deionized water retention amount has been reached, care must be given to the fact that there is a time lag between the point at which the deionized water is introduced and the point at which the deionized water permeates between the particles of the functional compound to form a uniform kneaded product. Therefore, at least at the stage that the total introduced amount of deionized water is an amount close to the maximum deionized water retention amount, it is preferable to temporarily stop introduction of the deionized water, then carry on kneading for a few minutes without introducing any deionized water, and to judge whether the deionized water is retained in the kneaded product without any exuding.

(2) Kneading of a Resin with the Kneaded Product of Deionized Water and Functional Compound In the present invention, next, a resin, and if necessary, an additive is added to the kneaded product consisting of deionized water and functional compound as obtained in the above-described step (1). The resultant mixture (hereinafter sometimes referred to simply as "mixture") is kneaded and heated under conditions in which the resin softens at a temperature equal to or lower than the boiling point of the deionized water to thereby disperse the functional compound into a softened resin.

The kneaded product obtained in the above-described step (1) contains a large amount of moisture. Further, the functional compound is uniformly dispersed in the kneaded product in its inherent particle size. For these reasons, while the deionized water in the functional compound is released out of the functional compound as a result of the evaporation and exuding-out associated with the rising temperature caused by heating, as long as the resin at this point is softened, the resin, which is insoluble in water and which has a high affinity with the functional compound, replaces the water due to the kneading and is incorporated between the respective particles of the functional compound. Accordingly, a kneaded dispersed compound can maintain a desired dispersed state of functional compound particles.

The conditions for softening the resin at the boiling point of the deionized water or lower can be selected depending on a resin to be used by regulating the air pressure of the heating atmosphere to adjust the deionized water boiling point.

Specifically, when using a resin which softens at a temperature of less than 100° C., for example, heating may be carried out at atmospheric pressure (where the boiling point of water is 100° C.). On the other hand, when using a resin which softens at a temperature of more than 100° C., an atmosphere can be pressurized so that the boiling point of the deionized water in the atmosphere is higher than the softening temperature of the resin being used.

In case of pressurizing a heated atmosphere to raise the deionized water boiling point in the atmosphere, it is preferable to heat a mixture consisting of a resin and the kneaded product obtained in the above-described step (1) in a sealed vessel to generate a pressurized atmosphere composed of the deionized water vapor released from the mixture. Pressurizing with water vapor in a sealed vessel not only enables the required temperature for softening the resin to be achieved by raising its boiling point, but also enables deionized water to be trapped in the chamber and the functional compound particles to be prevented from aggregating again and scattering due to sudden loss of the deionized water. The functional compound particles can thus be uniformly dispersed in a softened resin while maintaining a desired dispersed state.

From the same perspective, in the present invention it is preferable to, first, knead a mixture consisting of a resin and the kneaded product obtained in the above-described step (1) while heating at atmospheric pressure, and then to seal the vessel and carry on heating to pressurize a atmosphere by generating deionized water vapor, whereby the mixture is kneaded while heating it under an pressurized atmosphere of water vapor.

In case of heating in the manner switching the atmosphere pressure, the sealing of the vessel is preferably carried out before the ambient temperature reaches 100° C., and typically it is done at the time of reaching 80 to 100° C. If the atmosphere pressure is switched prior to reaching the deionized water boiling point, an adequate amount of deionized water is left in the vessel. Thus, when sealing the vessel after switching, the temperature required for softening the resin can be achieved, and the functional compound particles can be prevented from aggregating again or scattering due to sudden loss of the deionized water.

The present invention has no restrictions on kneading means, and an ordinary kneader may be used. However, when heating and kneading a mixture consisting of a resin and the kneaded product obtained in the above-described step (1) while controlling the atmosphere pressure as described above, it is preferable to use, for example, a kneader as illustrated in FIG. 1 which comprises deionized water introducing means 2 and kneading means 3 as well as vessel opening/closing means 7 (e.g. a gate valve for switching the communicating state between the vessel interior and vessel exterior) which seals the kneading vessel to raise the atmosphere pressure in the kneading vessel, heating and cooling means (not shown) (e.g. a heating-cooling medium supply member which supplies high temperature steam or cooling water to a stirring shaft or a jacket), pressure measuring means 9 capable of measuring the vessel interior pressure, temperature measuring means 10 for measuring the vessel interior temperature, and means for collecting and removing the freely evaporated deionized water (e.g. a condenser) 6.

The resin used in the present invention is not especially limited, other than it must be a solid at room temperature. A resin used in the present invention may, for instance, include polyester resin, polyamide resin, butyral resin, vinyl chloride acetate resin, vinyl chloride resin, ethylene-vinyl acetate resin, cellulose acetate butyrate resin, modified polyethylene resin, acrylic resin and the like. As described above, the process according to the present invention can be applied even if the resin to be used has a softening temperature exceeding 100° C. Typically, when heating under high-pressure water vapor using an ordinary apparatus, the water vapor temperature in the apparatus is often about 150° C. Therefore, in a situation like this it is preferable to use a resin capable of softening at less than 150° C.

Further, the present invention is also suitable for resins which, since their molecular weight is large, require the functional compound to be dispersed therein by a kneading step with an organic solvent and a roll-kneading step; or resins which deteriorate in quality due to localized heating caused by shear force load developed during the roll-kneading step.

Additives which may optionally be used in the present invention may include heat stabilizers. Heat stabilizers are preferably added, for example, to a resin of which heat stability is susceptible to being degraded by low-level heating, such as PVC resins. Additives which may optionally be used in the present invention may include plasticizers which promote the softening of a resin used by the present invention. The plasticizer preferably does not contain volatile components harmful to a human body. Examples of the plasticizer may include, for instance, epoxy plasticizers, phthalate plasticizers such as dioctyl phthalate and the like, phosphate plasticizers such as tricresyl phosphate and the like, adipate plasticizers such as diisooctyl adipate and the like, sebacate plasticizers such as dibutyl sebacate and the like.

In the meantime, as described above, in the process of the present invention, the dispersing properties of the functional compound in the resultant mixture are improved by kneading a functional compound using only deionized water, so that a pigment dispersant such as a surfactant does not normally need to be added, and even if added, it is still less than conventional materials.

(3) Moisture Distillation Step

In the present invention, finally, the kneaded product obtained in the above step (2) is further kneaded while heating it under atmospheric pressure or reduced pressure in order to distill off moisture therein.

In the above-described step (2), the mixture consisting of a functional compound, deionized water, a resin and the like is heated under the conditions in which the resin is softened at or below the boiling point of the deionized water. Accordingly, moisture may remain even after the resin has softened and the functional compound has dispersed therein. In such a case, the vessel interior is preferably changed to an atmosphere in which moisture can be easily distilled off as described above, and the moisture in the kneaded product is distilled off.

Specifically, at the point where the functional compound has been well dispersed into the softened resin, the vessel interior is changed to an open system, and the kneading is continued under an atmospheric pressure to remove the deionized water. Alternatively, means for condensing and removing steam is equipped at the vessel interior. Then, the pressure of the vessel interior is reduced and the kneading is continued under the reduced pressure to remove the deionized water. Naturally, means which proactively condense and remove the steam may also be equipped in the open system.

The specific judgment as to the timing for switching the vessel interior to an open system may be carried out, for example, by observing the vessel interior through a spyglass or the like, and taking as a rough guide the point at which an approximate transparent water phase is released from the kneaded product of the resin and functional compound.

As the moisture in the vessel interior decreases, the temperature in the vessel begins to rise and exceed the deionized water boiling point. Accordingly, it is preferable that the temperature in the vessel during kneading is maintained at a desired level by supplying cooling water or high temperature steam onto the jacket or shaft, for example. In this context, the temperature in the vessel is preferably adjusted taking into account heat generated by the kneading. Further, when using a resin with low heat stability, such as a vinyl chloride resin, it is preferable to maintain the vessel interior temperature as close to the boiling point of the deionized water as possible.

In the present invention, the step (3) terminates at the time when the moisture has been eliminated, preferably followed by carrying out a rapid cooling. The point when moisture has been eliminated can be determined with the naked eye based on, for example, clouding of a glass plate.

According to the present invention comprising the above-described steps (1) to (3), a mass of a solid dispersion wherein a particulate functional compound is dispersed into a resin in its inherent particle size can be obtained without any organic solvent. Normally, the solid dispersion mass can be made into a commercial product by crushing it into sizes of between 1 mm and 3 mm with a pelletizer or a crusher.

EXAMPLES

The present invention will now be explained in more detail with reference to the following Examples. However, the present invention should not be limited by the Examples mentioned below.

Example 1

(1) First Step

A kneader as used is illustrated in FIG. 1, and is equipped with two shafts and a two-stage deformed sigma kneading blade, which is a pair of kneading blades capable of rotating both in an inner direction (positive rotation) and in an outer direction (reverse rotation) to each other, attached thereto.

The front blades were set to rotate in a positive rotation 30 times per minute, and the back blades in a positive rotation 24 times per minute.

First, the kneader with the kneading section total volume of 3 L was charged with the following pigment and deionized water.

| | |
|---|---|
| C.I. Pigment Orange 13 (Pyrazolone Orange Vermilion 900, manufactured by Dainichiseika Color and Chemicals Mfg. Co., Ltd.) | 1,200 g |
| Deionized water (1 µS/cm electric conductivity) | 200 g |

Next, the deionized water was continuously added for 10 minutes at the rate of 20 ml per minute. The rate was then raised to 50 ml per minute, and the deionized water was continuously added while watching the condition of the resultant mixture. When the deionized water had been continuously added for 20 minutes, and the total amount had reached 1,400 ml, the resultant mixture had become dough-like state. The adding of deionized water was stopped, but the kneading was continued for a further 5 minutes, and then stopped.

(2) Second Step

The following solid resin was added to the kneaded product obtained in the first step.

| | |
|---|---|
| Polyamide resin Tohmide 394 N (softening point of between 105 to 115° C., manufactured by Fuji Kasei Kogyo Co., Ltd.) | 800 g |

Once the solid resin had been added, the gate valve was opened to change the atmosphere into an open system, and kneading was started under an atmospheric pressure. During the kneading, high temperature steam at a pressure of 0.4 mPa was passed through the kneading blade shaft cavity and jacket, so that kneading was continued while heating the mixture containing the solid resin.

Figure 2:
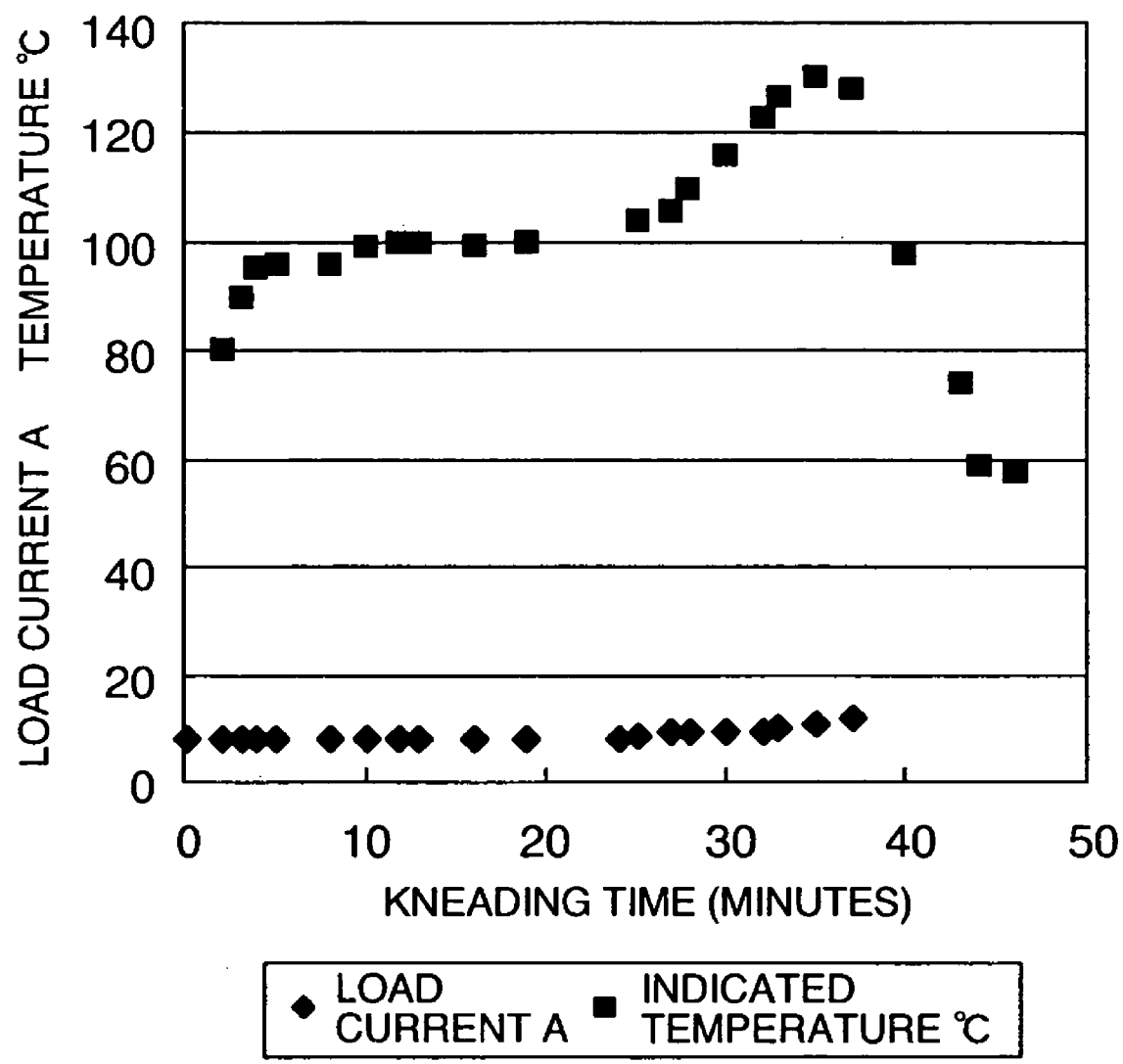
FIG. 2 is a graph illustrating the transition in the load current and temperature inside the vessel during heating of the second step in Example 1.

The development in temperature during the kneading as measured by a thermometer 10 arranged at a center section of the vessel is shown in Table 1 and FIG. 2. The kneading was stopped at the time when a glass plate put in the kneader upper section during kneading was no longer cloudy. Further, immediately after the end point had been reached, cooling was carried out.

TABLE 1

| Kneading time (minutes) | Operation | Load Current (A) | Indicated Temperature (° C.) |
|---|---|---|---|
| 0 | Start | 8.0 | |
| 2 | | 8.0 | 80 |
| 3 | | 8.0 | 90 |
| 4 | | 8.0 | 95 |
| 5 | | 8.0 | 96 |
| 8 | | 8.0 | 96 |
| 10 | | 8.0 | 99 |
| 12 | | 8.1 | 100 |
| 13 | | 8.1 | 100 |
| 16 | | 8.1 | 99 |
| 19 | | 8.0 | 100 |
| 24 | | 8.2 | 102 |
| 25 | | 8.5 | 104 |
| 27 | | 9.0 | 106 |
| 28 | | 9.0 | 110 |
| 30 | | 9.5 | 116 |
| 32 | | 9.5 | 123 |
| 33 | | 9.8 | 127 |
| 35 | | 10.5 | 131 |
| 37 | Stop | 12.0 | 128 |
| 40 | Cooling | | 98 |
| 43 | | | 74 |
| 44 | | | 59 |
| 46 | | | 58 |

The obtained mass-like kneaded product was formed into a sheet using a sheet making machine with simple rolls of 6 inches in diameter, and the sheet was then crushed into pieces between 1 mm and 3 mm in size with a sample mill. The resultant chips consisting of a solid dispersion were used as chips (1).

Comparative Example 1

Using the same kneader as in Example 1 on the condition that the lid as illustrated in FIG. 1 was removed, chips were produced in accordance with the conventional standard steps using a plunger midway through the process.

Specifically, first, the kneader with kneading section total volume of 3 L was charged with the following pigment and resin.

| | |
|---|---|
| C.I. Pigment Orange 13 (Pyrazolone Orange Vermilion 900, manufactured by Dainichiseika Color and Chemicals Mfg. Co., Ltd.) | 1,200 g |
| Polyamide resin Tohmide 394 N (softening point of between 105 to 115° C., manufactured by Fuji Kasei Kogyo Co., Ltd.) | 800 g |

Next, preparatory stirring was performed for 2 minutes, followed by adding an organic solvent having the following composition into the stirred mixture.

| | |
|---|---|
| Isopropyl alcohol | 168 g |
| Acetone | 248 g |

After the organic solvent had been added, high temperature steam at a pressure of 0.4 mPa was immediately passed through the kneading blade shaft cavity and jacket to carry out preparatory stirring for 3 minutes while heating the mixture.

Next, kneading was carried out with a plunger while cooling the mixture by passing cooling water instead of high temperature steam through the kneading blade shaft cavity and jacket. To suppress the plunger from being elevated up towards the upper side by the mixture being kneaded, the gauge pressure for pushing down on the plunger was set at about 0.02 mPa. Kneading was continued for a total of 7 minutes while discharging the evaporated organic solvent by a duct. The obtained mass was coarsely crushed to give an average particle size of about 50 mm.

Subsequently, 400 g of the coarsely crushed product obtained in the above step was introduced into a space between 6 inch diameter compact twin rolls. Roll-kneading was then carried out for 25 minutes. The roll-kneading was carried out by a roll-kneading process which repeats the steps consisting of performing roll-kneading by twisting the mixture being kneaded around the one of two rolls for a certain period, rolling off the kneaded product in a state of a sheet form by cutting the kneaded product on the roll in the direction Of an axis using a knife, and again charging the kneaded product in between the twin rolls and performing roll-kneading. Finally, the kneaded product which had been obtained in a sheet form was crushed into pieces between 1 mm and 3 mm in size with a sample mill. The resultant chips consisting of a solid dispersion were used as comparative chips (1).

Evaluation

The chips (1) obtained in Example 1 and the comparative chips (1) obtained in Comparative Example 1 were used to prepare a solution for evaluation and a coated plate for evaluation in the following procedure, and these are subjected to the tests for a performance evaluation of the respective chips.

(1) Production of a Solution for Evaluation

First, Thinner A was produced in accordance with the following composition:

| | |
|---|---|
| Toluene: | 50 parts by weight |
| Isopropyl alcohol (IPA): | 40 parts by weight |
| Butyl cellosolve: | 10 parts by weight |

Next, a 150 ml glass bottle was charged with the Thinner A and the following resin in accordance with the following composition.

| | |
|---|---|
| Thinner A: | 31.5 parts by weight |
| Polyamide resin Tohmide 394N: (softening point of between 105 to 115° C., manufactured by Fuji Kasei Kogyo Co., Ltd.) | 12.7 parts by weight |

Subsequently, while stirring this mixed solution at 600 rpm with a 30 mm-diameter propeller-type stirrer having 2 blades, the respective following chips were gradually added thereto.

| | |
|---|---|
| Chips (1): | 5.80 parts by weight |
| Comparative chips (1): | 5.80 parts by weight |

Once the adding was completed, the glass bottles which contained the respective solutions were covered with a 0.1 mm lid made from polyester resin so that the chips did not fly out. While watching the condition of the solutions, the stirring speed of a 30 mm-diameter twin-blade propeller-type stirrer was raised to 900 rpm, and then the full speed of 1,300 rpm. The stirring continued for a total of 3 hours to resolve the resin completely. The respective solutions were provided as evaluation solution (1) and comparative solution (1).

(2) Preparation of Coated Plate for Evaluation

A PET film in 50 micron-thick and 100×150 mm size was placed onto a silicon rubber sheet. Then, the evaluation solution (1) and comparative solution (1) were drawn in two lines onto the PET film with a No. 10 bar coater. At the time when they had become tack-free, the coated films were dried for 30 minutes at 40° C. with a drier to thereby produce the coated plates for evaluation.

(3) Evaluation Method and Evaluated Results

The evaluation method and evaluated results for the Example 1 and Comparative Example 1 chips carried out using the respective evaluation solution (1) and comparative solution (1) are as shown in the below Table 2.

TABLE 2

| Performance evaluation items | Evaluation method | Example 1 (present invention) Evaluation solution (1) | Comparative Example 1 Comparative solution (1) |
|---|---|---|---|
| Transparency | Naked eye determination by viewing the coated plate through a projector (comparison test against the comparative solution (1)) | More transparent than standard | Transparent with no haze Standard |
| Dispersibility | Evaluated by the powder gauge B method of JIS K5400 and displayed based on particle size | 10μ or less | 10μ or less |

TABLE 2-continued

| Performance evaluation items | Evaluation method | Example 1 (present invention) Evaluation solution (1) | Comparative Example 1 Comparative solution (1) |
|---|---|---|---|
| Gloss | 60-60 degree reflectance according to a gloss meter | 80.2 | 73.5 |
| Visually appreciated gloss | Naked eye determination of the coated plate | Greater sense of gloss than standard | Standard |
| Tone | Comparison of the naked eye determination of the coated plate with the comparative solution (1) | Equivalent | Standard |
| Hidingproperties | Same as above | Equivalent | Standard |

As illustrated in Table 2, in Example 1 of the present invention, a solid dispersion was obtained with superior performance to Comparative Example 1 without any organic solvents or any roll-kneading steps as carried out in Comparative Example 1.

Example 2

(1) First Step

Using the same kneader with the kneading section total volume of 3 L as in Example 1, the kneader was charged with the following pigment and deionized water.

| | |
|---|---|
| C.I. Pigment Red 146 (Carmine FBB02, manufactured by Clarient Japan Co., Ltd.) | 1,000 g |
| Deionized water (1 μS/cm electric conductivity) | 200 g |

Next, the deionized water was continuously added for 10 minutes at the rate of 20 ml per minute. The rate was then raised to 50 ml per minute, and the deionized water was continuously added while watching the condition of the resultant mixture. When the deionized water had been continuously added for 15 minutes, and the total amount had reached 1,150 ml, the resultant mixture became dough-like state. The adding of deionized water was stopped, but the kneading was continued for a further 5 minutes, and then stopped.

(2) Second Step

The following solid resin was added to the kneaded product obtained in the first step, and the mixture was kneaded under heating in the same manner as in Example 1.

| | |
|---|---|
| Butyral resin S-LEC BL-1 (weight average molecular weight of 66,000, manufactured by Sekisui Chemical Co., Ltd.) | 1,000 g |

Figure 3:
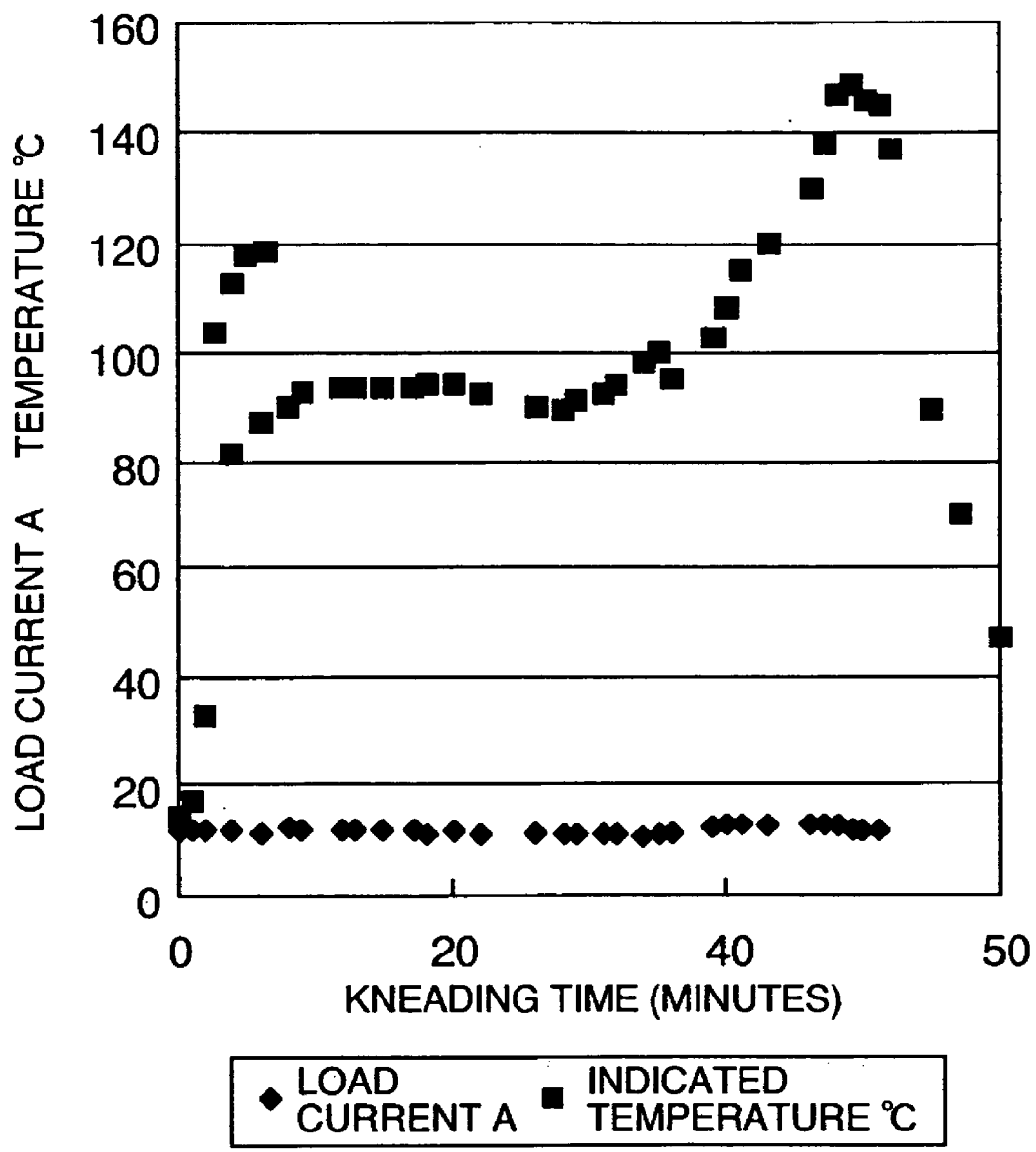
FIG. 3 is a graph illustrating the transition in the load current and temperature inside the vessel during heating of the second step in Example 2.
Figure 5:
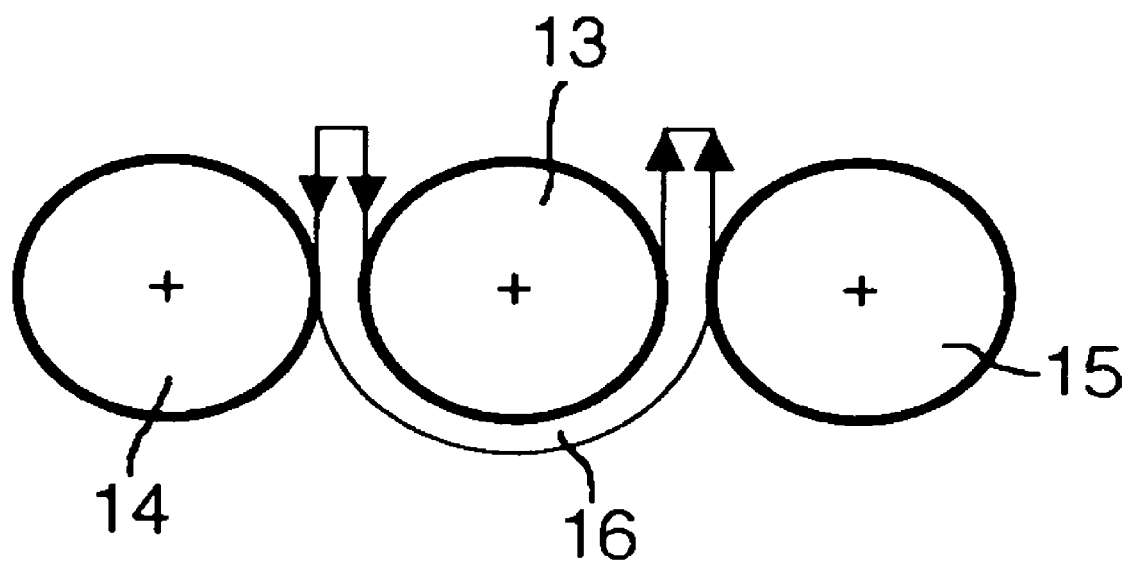
FIG. 5 is a pattern diagram illustrating a roll step model carried out using three rolls as proposed by T. C. Patton.

The development in temperature during the kneading as measured by a thermometer 10 arranged at a center section of the vessel is shown in Table 3 and FIG. 3. The kneading was stopped at the time at which a glass plate put in the kneader upper section during kneading was no longer cloudy. Further, immediately after the end point had been reached, cooling was carried out.

TABLE 3

| Kneading time (minutes) | Operation | Load Current (A) | Indicated Temperature (° C.) |
|---|---|---|---|
| 0 | Start | 12 | 14 |
| 1 | | 12 | 17 |
| 2 | | 12 | 33 |
| 4 | | 12 | 81 |
| 6 | | 11.5 | 87 |
| 8 | | 12.5 | 90 |
| 9 | | 12 | 92 |
| 12 | | 12 | 93 |
| 13 | | 12 | 93 |
| 15 | | 11.8 | 93 |
| 17 | | 11.8 | 93 |
| 18 | | 11.5 | 94 |
| 20 | | 11.8 | 94 |
| 22 | | 11.3 | 92 |
| 26 | | 11 | 90 |
| 28 | | 11.5 | 89 |
| 29 | | 11 | 91 |
| 31 | | 11.2 | 92 |
| 32 | | 11.5 | 94 |
| 34 | | 10.8 | 98 |
| 35 | | 11.3 | 100 |
| 36 | | 11.3 | 95 |
| 39 | | 12.5 | 102 |
| 40 | | 12.8 | 108 |
| 41 | | 12.8 | 115 |
| 43 | | 12.8 | 120 |
| 46 | | 12.8 | 130 |
| 47 | | 12.8 | 138 |
| 48 | | 12.8 | 147 |
| 49 | | 12.3 | 149 |
| 50 | | 12 | 146 |
| 51 | Stop | 12 | 145 |
| 52 | Cooling | | 137 |
| 55 | | | 90 |
| 57 | | | 70 |
| 60 | | | 48 |

The obtained mass-like kneaded product was formed into a sheet using a sheet making machine with simple rolls of 6 inches in diameter, and the sheet was then crushed into pieces between 1 mm and 3 mm in size with a sample mill. The resultant chips consisting of a solid dispersion were used as chips (2).

Comparative Example 2

Using the same kneader as in Example 1 on the condition that the lid as illustrated in FIG. 1 was removed, chips were produced in accordance with the conventional standard steps using a plunger midway through the process.

Specifically, first, the kneader with the kneading section total volume of 3 L was charged with the following pigment and organic solvent.

| | |
|---|---|
| C.I. Pigment Red 146 (Carmine FBB02, manufactured by Clarient Japan Co., Ltd.) | 1,000 g |
| Methylisobutylketone | 100 g |
| Ethyl acetate | 200 g |

Next, preparatory stirring was performed for 2 minutes, followed by adding the following resin into the stirred mixture.

| | |
|---|---|
| Butyral resin S-LEC BL-1 (weight average molecular weight of 66,000, manufactured by Sekisui Chemical Co., Ltd.) | 1,000 g |

After the resin had been added, high temperature steam at a pressure of 0.4 mPa was immediately passed through the kneading blade shaft cavity and jacket to carry out preparatory stirring for 5 minutes while heating the mixture.

Next, kneading was carried out with a plunger while cooling by passing cooling water instead of high temperature steam through the kneading blade shaft cavity and jacket. To suppress the plunger from being elevated up towards the upper side by the mixture being kneaded, the gauge pressure for pushing down on the plunger was set at about 0.02 mPa. Kneading was continued for a total of 4 minutes while discharging the evaporated organic solvent by a duct. The obtained mass was coarsely crushed to give an average particle size of about 60 mm.

Subsequently, 400 g of the coarsely crushed product obtained in the above step was introduced into a space between 6 inch diameter compact twin rolls. Roll-kneading was then carried out for 15 minutes. The roll-kneading was carried out by a roll-kneading process which repeated the steps consisting of performing roll-kneading by twisting the mixture being kneaded around the one of two rolls for a certain period, rolling off the kneaded product which was in a state of a sheet form by cutting the kneaded product on the roll in the direction of an axis using a knife, and again charging the kneaded product in between the twin rolls and performing roll-kneading.

Further, cut-kneading process which comprises the steps of folding the sheet, placing it between rolls, pulling it out from a roll bottom portion while stretching it in a sheet-shape, again folding this sheet, changing the orientation of the sheets, again placing between rolls and pulling the sheet out from a roll bottom portion while stretching in a sheet-shape) was repeated 40 times. Finally, the kneaded product which had been obtained in a sheet form was crushed into pieces between 1 mm and 3 mm in size with a sample mill. The resultant chips consisting of a solid dispersion were used as comparative chips (2).

Evaluation

The chips (2) obtained in Example 2 and the comparative chips (2) obtained in Comparative Example 2 were used to prepare a solution for evaluation and a coated plate for evaluation in the following procedure, and these are subjected to the tests for a performance evaluation of the respective chips.

(1) Production of a Solution for Evaluation

Thinner A was produced as described in Example 1, and then a 150 ml glass bottle was charged with thinner A and the following resin in accordance with the following composition.

| | |
|---|---|
| Thinner A: | 36.50 parts by weight |
| Resin S-LEC BL-1: | 6.75 parts by weight |

Subsequently, while stirring this mixed solution at 600 rpm with a 30 mm-diameter propeller-type stirrer having 2 blades, the respective following chips were gradually addedd thereto.

| | |
|---|---|
| Chips (2): | 7.0 parts by weight |
| Comparative chips (2): | 7.0 parts by weight |

Once the adding was completed, the respective chips were dissolved in the same manner as in Example 1. The resultant respective solutions were provided as evaluation solution (2) and comparative solution (2).

(2) Production of the Evaluation Coated Plate

In the same manner as in Example 1, a PET film in 50 micron-thick and 100×150 mm size was placed onto a silicon rubber sheet. Then, the evaluation solution (2) and comparative solution (2) were drawn in two lines onto the PET film with a No. 10 bar coater. At the time when they had become tack-free, the coated films were dried for 30 minutes at 40° C. with a drier to thereby produce the coated plates for evaluation.

(3) Evaluation Method and Evaluated Results

The evaluation method and evaluated results for the Example 2 and Comparative Example 2 chips carried out using the respective evaluation solution (2) and comparative solution (2) are as shown in the below Table 4.

TABLE 4

| Performance evaluation items | Evaluation method | Example 2 (present invention) Evaluation solution (2) | Comparative Example 2 Comparative solution (2) |
|---|---|---|---|
| Transparency | Naked eye determination by viewing the coated plate through a projector (comparison test against the comparative solution (2)) | More transparent than Comparative Example 2 | Transparent with no haze Standard |
| Dispersibility | Evaluation solution is evaluated by the powder gauge B method of JIS K5400 and particle size is shown based on: | 10 μ or less | 25 μ |
| Gloss | 60-60 degree reflectance according to a gloss meter | 91.3 | 87.1 |
| Visually appreciated gloss | Naked eye determination of the coated plate | Greater sense of gloss than Comparative Example 2 | Standard |
| Tone | Comparison of the naked eye determination of the coated plate with the comparative solution (2) | Equivalent | Standard |
| Hiding properties | Same as above | Equivalent | Standard |

As illustrated in Table 4, in Example 2 of the present invention a solid dispersion was obtained with superior performance to Comparative Example 2 without any organic solvents or any roll-kneading steps as carried out in Comparative Example 2.

Example 3

(1) First Step

Using the same kneader with the kneading section total volume of 3 L as in Example 1, the kneader was charged with the following pigment and deionized water.

| | |
|---|---|
| C.I. Pigment Red 146 (Carmine FBB02, manufactured by Clarient Japan Co., Ltd.) | 800 g |
| Deionized water (1 μS/cm electric conductivity) | 200 g |

Next, the deionized water was continuously added for 10 minutes at the rate of 20 ml per minute. The rate was then raised to 60 ml per minute, and the deionized water was continuously added while watching the condition of the resultant mixture. When the deionized water had been continuously added for 10 minutes, and the total amount had reached 1,000 ml, the resultant mixture became dough-like state. The adding of deionized water was stopped, but the kneading was continued for a further 5 minutes, and then stopped.

(2) Second Step

The following solid resin and plasticizer were added to the kneaded product obtained in the first step.

| | |
|---|---|
| Vinyl chloride acetate resin Vinylite VMCC (number average molecular weight of 19,000, Tg of 72° C., manufactured by Union Carbide) | 1,160 g |
| Epoxy plasticizer, Adeka Cizer O-130P (manufactured by Adeka Corporation) | 40 g |

Once the solid resin had been added, the gate valve 7 was opened to change the atmosphere into an open system, and kneading was started at an atmospheric pressure. During the kneading, high temperature steam at a pressure of 0.4 mPa was passed through the kneading blade shaft cavity and jacket, so that kneading was continued while heating the mixture containing the solid resin.

Next, once the temperature as measured by a thermometer 10 arranged at a center section of the vessel had reached 100° C., the gate vale 7 illustrated in FIG. 1 was closed to change the atmosphere into a closed system, and then kneading was continued while heating. The inner pressure was gradually raised and reached about 0.042 mPa. The temperature of the thermometer 10 also gradually increased slightly behind the pressure-rise. At the time when the temperature had again increased under this high pressure, the gate valve 7 was gradually opened to return the atmosphere to atmospheric pressure, and the lid was then removed. The pigment in the vessel at this stage had completely been incorporated into the softened resin. Subsequently, continuing the kneading under the same conditions, although the temperature in the vessel did at first drop due to the lidr being removed, the temperature again rose in a short period of time due to the heat generated by the continued heating and kneading.

The development in temperature during the kneading as measured by a thermometer 10 arranged at a center section of the vessel is shown in Table 5 and FIG. 4. The kneading was stopped at the time when a glass plate put in a kneader upper section during kneading was no longer cloudy. Further, immediately after the end point had been reached, cooling was carried out.

| Time (minutes) | | Pressure (mPa) | Load (A) | Temperature (° C.) |
|---|---|---|---|---|
| 0 | Start | | 11.2 | 16 |
| 3 | | | 11.2 | 19 |
| 5 | | | 11.2 | 37 |
| 6 | | | 11 | 58 |
| 7 | | | 11.2 | 74 |
| 8 | | | 11.6 | 83 |
| 9 | | | 11 | 88 |
| 10 | | | 11 | 90 |
| 11 | | | 10.8 | 92 |
| 13 | | | 11 | 93 |
| 15 | | | 11.2 | 94 |
| 16 | | | 10.8 | 95 |
| 18 | | | 10.6 | 97 |
| 21 | | | 10.8 | 98 |
| 23 | | | 10.8 | 99 |
| 24 | Sealed | 0 | 10.8 | 100 |
| 25 | | 0 | 10.8 | 102 |
| 26 | | 0 | 10.8 | 104 |
| 27 | | 0 | 10.7 | 105 |
| 28 | | 0 | 10.8 | 106 |
| 29 | | 0 | 10.8 | 107 |
| 30 | | 0 | 10.5 | 108 |
| 31 | | 0 | 10.8 | 109 |
| 32 | | 0 | 10.8 | 111 |
| 33 | | 0 | 10.8 | 112 |
| 35 | | 0 | 10.5 | 113 |
| 36 | | 0 | 10 | 114 |
| 37 | | 0 | 10.5 | 115 |
| 38 | | 0 | 10.5 | 116 |
| 39 | | 0.01 | 10.5 | 116 |
| 40 | | 0.01 | 10.2 | 114 |
| 41 | | 0.01 | 10.5 | 113 |
| 42 | | 0.014 | 10.5 | 112 |
| 43 | | 0.016 | 10.5 | 111 |
| 45 | | 0.02 | 10.5 | 111 |
| 47 | | 0.024 | 10.2 | 111 |
| 49 | | 0.0265 | 10.5 | 112 |
| 51 | | 0.0310 | 10.5 | 112 |
| 53 | | 0.0350 | 10.5 | 113 |
| 55 | | 0.0420 | 10.5 | 114 |
| 57 | Opened | 0.0420 | 10.5 | 114 |
| 58 | | 0.0000 | 11 | 108 |
| 59 | | 0.0000 | 11.2 | 110 |
| 60 | | 0.0 | 11.5 | 113 |
| 61 | | 0 | 12 | 115 |
| 62 | | 0 | 13 | 117 |
| 63 | | 0 | 13.5 | 119 |
| 64 | | 0 | 15 | 121 |
| 65 | | 0 | 16 | 123 |
| 66 | | 0 | 15 | 126 |
| 67 | | 0 | 14 | 130 |
| 67.7 | | 0 | 14 | 133 |
| 68 | | 0 | | 134 |
| 70 | | 0 | | 117 |
| 73 | | 0 | | 60 |

The obtained mass-like kneaded product was formed into a sheet using a sheet making machine with simple rolls of 6 inches in diameter, and the sheet was then crushed into pieces between 1 mm and 3 mm in size with a sample mill. The resultant chips consisting of a solid dispersion were used as chips (3).

Comparative Example 3

In Comparative Example 3, the first and second steps were carried out in the same manner as in Example 1, except that the second step was carried out in an open system, and 58 g of methylisobutylketone (5% by weight of the resin content) was added. However, once there was no more moisture at the end of the second step, naked pigment flew off, so that the process had to be stopped. It was thus learned that, for a resin having a high softening point, a solid dispersion could not be obtained unless the method of Example 3 was employed.

Comparative Example 4

Using the same kneader as in Example 1 on the condition that the lid as illustrated in FIG. 1 was 25, removed, chips were produced in accordance with the conventional standard steps using a plunger midway through the process.

Specifically, first, the kneader with the kneading section total volume of 3 L was charged with the following pigment, plasticizer and solvent.

| | |
|---|---|
| C.I. Pigment Red 146 (Carmine FBB02, manufactured by Clarient Japan Co., Ltd.) | 800 g |
| Epoxy plasticizer (Adeka Cizer O-130P, manufactured by Adeka Corporation) | 40 g |
| Methylisobutylketone | 32 g |
| Methyl ethyl ketone | 96 g |
| Methylcyclohexane | 80 g |

Next, preparatory stirring was performed for 3 minutes, followed by adding the following resin into the stirred mixture.

Vinyl chloride acetate resin Vinylite VMCC 1,160 g (number average molecular weight of 19,000, Tg of 72° C., manufactured by Union Carbide)

After the organic solvent had been added, high temperature steam at a pressure of 0.4 mPa was immediately passed through the kneading blade shaft cavity and jacket to carry out preparatory stirring for 5 minutes while heating the mixture.

Next, kneading was carried out with a plunger while cooling by passing cooling water instead of high temperature steam through the kneading blade shaft cavity and jacket. To suppress the plunger from being elevated up towards the upper side by the mixture being kneaded, the gauge pressure for pushing down on the plunger was set at about 0.02 mPa. Kneading was continued for a total of 6 minutes while discharging the evaporated organic solvent by a duct. The obtained mass was coarsely crushed to give an average particle size of about 60 mm.

Subsequently, 400 g of the coarsely crushed product obtained in the above step was introduced into a space between 6 inch diameter compact twin rolls. Cut-kneading which comprise the steps of folding the sheet, placing it between rolls, pulling it out from a roll bottom portion while stretching it in a sheet-shape, again folding this sheet, changing the orientation of the sheet faces, again placing between rolls and pulling the sheet out from a roll bottom portion while stretching it in a sheet-shape was repeated 40 times. Finally, the kneaded product which had been removed in a sheet form was crushed into pieces between 1 mm and 3 mm in size with a sample mill. The resultant chips consisting of a solid dispersion were used as comparative chips (3).

Evaluation

The chips (3) obtained in Example 3 and the comparative chips (3) obtained in Comparative Example 4 were used to prepare a solution for evaluation and a coated plate for evaluation in the following procedure, and these are subjected to the tests for a performance evaluation of the respective chips.

(1) Production of the Evaluation Solution

Varnish solution B was produced by dissolving the following ingredients under stirring at atmospheric pressure for 1 hour.

| | |
|---|---|
| Vinyl chloride acetate resin Vinylite VMCC (number average molecular weight of 19,000, Tg of 72° C., manufactured by Union Carbide) | 12 parts by weight |
| Methyl ethyl ketone | 30 parts by weight |
| Ethyl acetate | 25 parts by weight |
| Toluene | 5 parts by weight |
| Acetone | 8 parts by weight |

Next, a 150 ml glass bottle was charged with the Varnish solution B and each of the following chips in accordance with the following composition.

| | |
|---|---|
| Varnish solution B | 40 parts by weight |
| Chips (3) or comparative chips (3): | 10 parts by weight |

Once the charging was completed, the glass bottles which contained the respective solutions were covered with a 0.1 mm lid made from polyester resin so that the chips did not fly out. While watching the condition of the solutions, the solutions were stirred and mixed at 600 rpm, then 900 rpm, and finally the full speed of 1,300 rpm using a 30 mm-diameter twin-blade propeller-type stirrer. The stirring continued for a total of 3 hours to dissolve the resin completely.

The respective solutions were provided as evaluation solution (3) and comparative solution (3).

(2) Preparation of Coated Plate for Evaluation

In the same manner as in Example 1, a PET film in 50 micron-thick and 100×150 mm size was placed onto a silicon rubber sheet. Then, using a No. 10 bar coater, evaluation solution (3) and the comparative solution (3) were drawn in two lines onto the PET film. The coated films were dried for 30 minutes using a drier at 40° C. at the point where they had become tack-free, to thereby produce the coated plates for evaluation.

(3) Evaluation Method and Evaluated Results

The evaluation method and evaluated results for the Example 3 and Comparative Example 4 chips carried out using the respective evaluation solution (3) and comparative solution (3) are as shown in the below Table 6.

TABLE 6

| Performance evaluation items | Evaluation method | Example 3 (present invention) Evaluation solution (3) | Comparative Example 4 Comparative solution (3) |
|---|---|---|---|
| Transparency | Naked eye determination by viewing the coated plate through a projector (comparison test against the comparative solution (3)) | More transparent than standard | Transparent with no haze Standard |
| Dispersibility | Evaluation solution is evaluated by the powder gauge B method of JIS K5400 and particle size is shown based on: | 10μ or less | 25μ |
| Gloss | 60-60 degree reflectance according to a gloss meter | 107.9 | 102.1 |
| Visually appreciated gloss | Naked eye determination of the coated plate | Greater sense of gloss than standard | Standard |
| Tone | Comparison of the naked eye determination of the coated plate with the comparative solution (3) | Equivalent | Standard |
| Hidingproperties | Same as above | Equivalent | Standard |

As illustrated in Table 6, in Example 3 of the present invention, a solid dispersion was obtained with superior performance to Comparative Example 4 by conventional process, even for a resin having a high softening point, without any organic solvents or any roll-kneading steps as carried out in Comparative Example 4. From this result, it was proved that when using a resin having a high softening temperature, it is effective to knead the resin while heating under elevated pressure in a sealed system.
Consideration The logical basis for why the special effects of the present invention which were proved by the above Examples can be obtained will be considered below.

(1) CHEMICAL BEHAVIOR OF THE PIGMENT AGGREGATES

The deionized water used in the present invention has a greater "amount corresponding to the oil absorbing amount" for the pigment as compared with an organic solvent[2]. Further, the pigment aggregates are broken up by the ion exchange[3]. Based on these facts, it is easier to consider the pigment aggregates by considering them as being in the following chemical equilibrium. That is, if the pigment primary particles are represented as "G", the pigment aggregate nuclei as "X", the pigment aggregates as "$G_n$", and the equilibrium constant as "K", then the pigment dough-forming step can be postulated as being a step which achieves the following equilibrium state.
[Expression 1]

$$XGn = nG + X \quad (1)$$

$$K = [G]^n \cdot [X]/[XGn] \quad (2)$$

The Kor in the organic solvent will now be compared with the Kw in the deionized water. As is well known, the electric potential φ at a given point, defined as the work of an electric field when bringing a unit positive charge towards infinity, is $\phi = q/\in r$[4] (wherein q represents charge, r represents the distance between two points, and ∈ represents dielectric constant). Therefore, if Kw/Kor is predicted from the values ∈(benzene)=2.29 and ∈(water)=81, it can be inferred that Kw/Kor is about 40. This relationship obviously proves the fact that a deionized water stand-alone system participates a great deal more in dispersion.

(2) CHEMICAL ENERGY RELATING TO PIGMENT DISPERSION

Systems which exhibit a large minus value for their reaction standard free enthalpy change ΔG° are stable production systems, which means that the reaction in such a system can easily proceed. The equilibrium constant K can be represented by the following formula[5].
[Expression 2]

$$\Delta G° = -RT \ln(K) \quad (3)$$

Here, if the corresponding standard free enthalpy change ΔG° is represented as ΔG° (w) and ΔG° (or), the respective formulae are:
[Expression 3]

$$\Delta G° = -RT \ln(Kw) \quad (4)$$

$$\Delta G° = -RT \ln(Kor) \quad (5)$$

and if Kw/Kor is assumed to equal 40, then:
[Expression 4]

$$\Delta G°(or) - \Delta G°(w) \quad (6)$$

$$= -RT\ln(Kor) - (-RT\ln(Kw))$$

$$= -0.059(-\log 40)$$

$$= 0.0945 e.v.$$

Since 1 e.v. = 23.054 kcal/mole

= 0.0359 HP·hr/mole, then

[Expression 5]

$$\Delta G°(or) = \Delta G°(w) + 2.178 \text{ kcal/mole}$$

$$= \Delta G°(w) + 0.03392(HP \cdot hr/\text{mole}).$$

This illustrates that in the organic solvent system the breaking up of the aggregates does not occur as easily as in the deionized water stand-alone system. Therefore, this can be understood that in an organic solvent system at least some kind of subsequent step comparable to 2.178 kcal/mole, i.e. 0.03392 HP·hr/mole, (e.g. a rolling step) is required.

(3) MECHANICAL ENERGY REQUIRED FOR PIGMENT DISPERSION Using the three roll energy formula proposed by T. C. Patton[6] (this roll step model is illustrated in the drawings), it will now be calculated whether the roll step energy E (units: HP-hr/gal) is comparable to the above 0.03392 HP·hr/mole.

This formula is as follows.

$$E = (8.5 \cdot 10^{-6} \cdot D^{5/3} \cdot n^3 \cdot \text{rpm}^{2/3} \cdot \rho^{1/3} \cdot \eta^{2/3}) / (x^{4/3} \cdot (1+n) ca) \quad \text{[Expression 6]}$$

In the expression, "D" denotes the roll diameter (in inches); "n" denotes the ratio of the center roll speed to the feed roll speed, or the ratio of the apron roll speed to the center roll speed; "rpm" denotes the feed roll revolution speed (rpm); "ρ" denotes the mill base density (pounds/gallon); "η" denotes the mill base viscosity (poise); "x" denotes the clearance between the feed roll and the center roll (mil); "c" denotes the fraction of the total flow Q flowing to the center roll, so that (1-c) represents the fraction of the total flow Q flowing to the feed roll; and "a" denotes the fraction of the total flow Q flowing to the apron roll which transfers to the apron roll, so that (1-a) represents the fraction that returns to the center roll.

If the set values are in fact matched and substituted in the following manner, $$x=200, D=16, c=1, n=0.781, a=1, \text{rpm}=18.5, \rho=20 \quad \text{[Expression 7]}$$

(d=2.4 cgs phase or similar), and $\eta=150,000$ ($\eta_{Tg}=10^{13}$, wherein the viscosity value at Tg+45° C. is estimated from the Williams-Landel-Ferry formula)[7]

E=0.01058 HP-hr/gal

This model is equivalent to carrying out cut-kneading two times. Since in actual practice such a step would be done between 30 to 60 times, this value multiplied by 15 to 30 times would correspond to the actual value. Accordingly, this is Eobs=0.158 to 0.317 (HP-hr/gal).

Since 1 gallon is equal to 3.78 liters, if the CGS specific weight is taken as 2.4, the weight will be 9.07 kg. With PWC=0.50, the pigment amount is 4.53 kg. If the pigment molecular weight is assessed as being 500, the number of moles of pigment is 4.53/0.5=9.07 mole. Accordingly, Eobs= (0.158 to 0.317)/9.07=0.0175 to 0.0350 (HP-hr/mole). If compared with the above-described chemical energy, that value is approximately comparable to the roll step energy.

(4) INTERPRETATION OF THE PIGMENT DISPERSION MECHANISM

Based on the above logical consideration, using water for kneading is an act which disperses by faithfully following the characteristics of a pigment, which can be understood as causing dispersing by utilizing chemical energy, unlike the conventional dispersing methods which have used mechanical energy.

(5) REFERENCE DOCUMENTS

1) European Ink Maker Vol. 184, No. 4384, S2-S5, (1994)
2) U.S. Pat. No. 6,136,907
3) Japanese Patent No. 3069537
4) Gentaro Araki; Butsurigaku Gaisetsu, p. 133-149, (1953), (Baifukan)
5) Masao Koizumi; Kagaku Heikou, (Kyoritsu Zensho 124), p. 203-250 (1957), Kyoritsu Shuppan)
6) T. C. Patton; Paint Flow and Pigment Dispersion, p. 303-325, 1964, (John Wiley & Sons, Inc.)
7) L. E. Nielsen (translated by Shigeharu Onoki); Mechanical Properties of Polymers, p. 14 (Kagakudojin) (1966)

The invention claimed is:

1. A process for producing a solid dispersion in which a functional compound is dispersed as fine particles in a resin, comprising the following steps:
   (1) kneading the functional compound with solely deionized water and no organic solvent while gradually adding the deionized water;
   (2) adding a polymerized resin which is insoluble in water and solid at room temperature, and optionally an additive to the kneaded product, and kneading the resultant mixture while heating it under the conditions in which the resin softens at a temperature equal to or less than a boiling point of the deionized water, whereby the functional compound is dispersed into the softened resin with no dispersing agent being present; and
   (3) kneading further the obtained kneaded dispersion while heating under atmospheric pressure or reduced pressure to distill off moisture contained in the kneaded dispersion,
wherein said process includes no ion-exchange step, and
wherein said functional compound is selected from the group consisting of a fluorescent coloring matter, electrochromic coloring matter, photochromic coloring matter, dichromatic coloring matter for polarizing films, thermochromic coloring matter, and piezochromic coloring matter; or is selected from the group consisting of a pigment, a near infrared ray absorbing compound, ultraviolet ray absorbing compound, a magnetic compound, and a flame-retardant compound.

2. The process for producing a solid dispersion according to claim 1, wherein in step (1) the initially introduced amount of deionized water is less than 30 parts by weight per 100 parts by weight of the functional compound, and, after the initial introduction, the deionized water is added stepwise or continuously at the rate of less than 10 parts by weight per minute per 100 parts by weight of the functional compound.

3. The process for producing a solid dispersion according to claim 2, wherein the rate of adding the deionized water after the initial introduction increases in a stepwise or continuous manner.

4. The process for producing a solid dispersion according to claim 1, wherein the resin is added to the kneaded product when a total amount of deionized water is within ±20% of a maximum amount in which the deionized water is retained in the kneaded product in the maximum amount without any exudation.

5. The process for producing a solid dispersion according to claim 1, wherein in step (2) the mixture in which the resin and optionally the additive have been added is heated in a sealed vessel to make the atmosphere inside the vessel a pressurized atmosphere of water vapor from the deionized water, and the mixture is kneaded while heating it in the atmosphere pressurized by the water vapor.

6. The process for producing a solid dispersion according to claim 1, wherein in step (2) the mixture in which the resin and optionally the additive have been added is first kneaded under atmospheric pressure while heating, then the vessel is sealed and heating is continued to make the atmosphere inside the vessel a pressurized atmosphere of water vapor from the deionized water, and the mixture is kneaded while heating it in the pressurized atmosphere.

7. The process for producing a solid dispersion according to claim 6, wherein the heating in the pressurized atmosphere of water vapor from the deionized water is started when the ambient temperature is not greater than 100° C.

8. The process for producing a solid dispersion according to claim 1, wherein in step (3) the obtained kneaded dispersion is further kneaded while heating under atmospheric pressure to distill off moisture contained in the kneaded dispersion.

9. The process for producing a solid dispersion according to claim 1, wherein in step (2), the heating causes dispersion of the functional compound into the softened resin.

10. The process for producing a solid dispersion according to claim 1, wherein in step (2), impurity electrolytes are eluted into the deionized water and in step (3) the impurity electrolytes are carried out of the composition when the deionized water is distilled off.

11. The process according to claim 3, wherein for a time period of 10 minutes after the initial introduction of deionized water, the kneading is performed while adding the deionized water in an amount of 1.5 to 2.5 parts by weight per 100 parts by weight of introduced functional compound per minute, and after the time period has elapsed, the deionized water is added in an amount of from 4.5 to 7.5 parts by weight per 100 parts by weight of introduced functional compound per minute.

12. A process according to claim 1 wherein the deionized water has an electric conductivity of 5 μS/cm or less.

* * * * *